United States Patent
Uchida et al.

(10) Patent No.: US 7,785,203 B2
(45) Date of Patent: Aug. 31, 2010

(54) COMMUNICATION GAME SYSTEM, COMMUNICATION SYSTEM, COMMUNICATION APPARATUS, AND COMMUNICATION STATE INDICATION METHOD

(75) Inventors: Tetsuro Uchida, Atsugi (JP); Masato Kuwahara, Kyoto (JP)

(73) Assignee: Nintendo Co., Ltd. (JP)

( * ) Notice: Subject to any disclaimer, the term of this patent is extended or adjusted under 35 U.S.C. 154(b) by 1407 days.

(21) Appl. No.: 10/801,762

(22) Filed: Mar. 15, 2004

(65) Prior Publication Data

US 2004/0180718 A1   Sep. 16, 2004

(30) Foreign Application Priority Data

Mar. 14, 2003  (JP)  ............................ 2003-070517

(51) Int. Cl.
A63F 9/24  (2006.01)
(52) U.S. Cl. ..................... 463/40; 463/1; 463/2; 463/6; 463/29; 463/30; 463/46; 463/47; 700/90; 700/91; 700/92; 700/93
(58) Field of Classification Search ..................... 463/1, 463/2, 6, 29–43, 46, 47; 700/90–93
See application file for complete search history.

(56) References Cited

U.S. PATENT DOCUMENTS

| | | | | |
|---|---|---|---|---|
| 4,372,558 A | * | 2/1983 | Shimamoto et al. | 463/41 |
| 4,521,014 A | * | 6/1985 | Sitrick | 463/31 |
| 4,572,509 A | * | 2/1986 | Sitrick | 463/31 |
| 4,958,835 A | * | 9/1990 | Tashiro et al. | 463/42 |
| 5,618,045 A | * | 4/1997 | Kagan et al. | 463/40 |
| 5,908,467 A | * | 6/1999 | Barrett et al. | 709/218 |
| 5,956,485 A | * | 9/1999 | Perlman | 709/204 |
| 5,964,660 A | * | 10/1999 | James et al. | 463/1 |

(Continued)

FOREIGN PATENT DOCUMENTS

GB   2355 168   4/2001

(Continued)

OTHER PUBLICATIONS

Office Action which issued on Jan. 30, 2007 in corresponding Japanese patent application No. 2003-070517, citing the above references.

*Primary Examiner*—Pierre E Elisca
(74) *Attorney, Agent, or Firm*—Baker & Hostetler, LLP

(57) ABSTRACT

A communication game system controlling a development of a game by establishing communication between plural terminal apparatuses and displaying shared information at the terminal apparatuses is provided, the system enabling easy recognition of a communication state of a communication established between the terminal apparatuses. The system includes plural game apparatuses that are adapted to establish communication. The game apparatus includes a display unit, an operation unit, and a processing unit for conducting self-controlled character display control and other character display control. The self-controlled character display control includes displaying on the display unit a self-controlled character that is controlled by an operation of the operation unit of the game apparatus. The other character display control includes receiving information pertaining to another character that is controlled by another game apparatus, and displaying the other character on the display unit. Also, the other character display control includes changing the display state of the other character controlled by the other game apparatus when the communication state of the communication with the other game apparatus deteriorates.

2 Claims, 11 Drawing Sheets

U.S. PATENT DOCUMENTS

| | | | |
|---|---|---|---|
| 6,152,824 A * | 11/2000 | Rothschild et al. | 463/40 |
| 6,356,288 B1 * | 3/2002 | Freeman et al. | 715/867 |
| 6,429,874 B1 * | 8/2002 | Miura | 345/589 |
| 6,500,070 B1 * | 12/2002 | Tomizawa et al. | 463/43 |
| 6,527,641 B1 * | 3/2003 | Sinclair et al. | 463/39 |
| 6,561,907 B2 * | 5/2003 | Shimizu et al. | 463/31 |
| 6,767,287 B1 * | 7/2004 | Mcquaid et al. | 463/42 |
| 2002/0002077 A1 * | 1/2002 | Shimizu et al. | 463/30 |
| 2006/0111179 A1 * | 5/2006 | Inamura | 463/29 |
| 2009/0069066 A1 * | 3/2009 | Yoshizawa | 463/20 |

FOREIGN PATENT DOCUMENTS

| | | |
|---|---|---|
| JP | 2000-262749 | 9/2000 |
| JP | 2002-078976 | 3/2002 |
| JP | 2002273057 | 9/2002 |
| JP | 4-117895 | 4/2004 |
| WO | WO 9625989 | 8/1996 |
| WO | WO 99/32990 | 7/1999 |
| WO | WO 9932990 | 7/1999 |
| WO | WO 0103374 | 1/2001 |
| WO | WO 03097194 | 11/2003 |

* cited by examiner

COMMUNICATION GAME SYSTEM, COMMUNICATION SYSTEM, COMMUNICATION APPARATUS, AND COMMUNICATION STATE INDICATION METHOD

BACKGROUND OF THE INVENTION

1. Field of the Invention

The present invention relates generally to a communication game system, a communication system, a communication apparatus, and a communication state indication method, and particularly to a game system that controls a development of a game by establishing communication between plural terminal apparatuses and displaying shared information at the terminal apparatuses.

2. Description of the Related-Art

In a conventional communication system, an indication unit for indicating a communication state between communication apparatuses is implemented. The indication unit may indicate a current reception level, or it may indicate a warning when an error occurs successively over a predetermined amount of time or when the rate of errors occurring within a predetermined time period reaches a certain level, for example (e.g., see Japanese Patent Laid-Open Publication No. 4-117895).

However, in indicating the current reception signal level in the conventional communication system, even when a reception signal level is indicated, it may not be possible to actually receive a reception signal due to an interference of the reception signal or a degradation of the reception signal caused by distortions in the transmission path, for example. Thus, the indicated reception signal level may be used as a reference, but it cannot indicate an enabled/disenabled state of a communication, for example.

Also, even in the case of indicating an occurrence of a communication error, it is difficult to detect a deterioration of a communication state. Particularly, in a communication game system, when a communication state is indicated according to the conventional art, the following problems become prominent.

FIG. 1 is a diagram illustrating a display screen of a game terminal apparatus of player A in a communication game system according to the conventional art.

During game play time, the player A pays attention to characters CA~CD that are controlled by the player A himself/herself (i.e., CA) and other players participating in the game (i.e., CB~CD), and also character C0 that appears in the game. Accordingly, when a communication state indication area 101 for indicating a communication state is separately provided in the display screen during play time as is shown in FIG. 1, the player A needs to look away from the game in order to check the communication state, and this makes it difficult for the player to concentrate on the game, possibly leading to manipulation errors or loss of focus on the game.

Also, when the communication state indication area 101 is separately provided in the display screen, this leads to a reduction of display space for displaying the game itself.

Also, during game play time, it is preferable that the player A be able to instantly check its communication state. However, in the case of providing a separate communication state indication area 101 as is shown in FIG. 1, when the player A wants to check its communication states with respect to plural characters CB~CD, it is difficult to instantly determine which communication state indications correspond to players of which characters CB~CD.

It is noted that although the problems of the related art are described with respect to the example of providing a separate communication state indication area 101 as is illustrated in FIG. 1, these problems are not limited to this particular case and apply to other conventional communication state indication techniques as well.

SUMMARY OF THE INVENTION

The present invention has been conceived in response to one or more problems of the related art and its object is to provide a communication game system, a communication system, a communication apparatus, and a communication state indication method for enabling easy recognition of a communication state.

It is also an object of the present invention to provide a communication game system for indicating a communication state to a player while enabling the player to concentrate on the game and maintain his/her focus.

It is another object of the present invention to provide a communication game system for enabling instant recognition of the respective communication states of communications established with players participating in a game.

According to an aspect of the present invention, a communication game system for executing a communication game is provided, the system including a game apparatus that is adapted to establish communication with at least one other game apparatus, the game apparatus including a display unit, an operation unit, and a processing unit. The processing unit executes processes for displaying on the display unit a self-controlled character that is controlled by an operation of the operation unit. The processing unit also executes processes for receiving information pertaining to another character that is controlled by an operation of the other game apparatus, displaying the other character on the display unit based on the received information, and changing a display state of the other character that is controlled by the operation of the other game apparatus when a communication state with the other game apparatus deteriorates.

According to one embodiment of the present invention, by changing a display state of another character that is controlled by an operation of another game apparatus when the communication state of a communication with the other game apparatus deteriorates, a communication state indication area does not have to be separately provided on the screen of the game apparatus, and thereby the communication state may be checked without having to look away from the heart of the game.

Accordingly, a player is able to concentrate on his/her game during game play time, and also, a large space may be secured for displaying the game content. according to a further embodiment, a player is able to instantly determine the other player with which communication is deteriorating from among plural players participating in a game.

According to another aspect of the present invention, a communication system for administering display of information is provided, the system including a communication apparatus that is adapted to establish communication with at least one other communication apparatus, the communication apparatus including a display unit and a processing unit. The processing unit executes processes for detecting a communication error occurring in a communication with the other communication apparatus, and changing a display state of information of the other communication apparatus when the communication error is detected in the communication with the other communication apparatus.

According to another aspect of the present invention, there is provided a communication apparatus that establishes communication with at least one other communication apparatus, the communication apparatus including a display unit and a processing unit. The processing unit executes processes for detecting a communication error in the communication with the other communication apparatus, and changing a display state of the information of the other communication apparatus when the communication error is detected in the communication with the other communication apparatus.

According to another aspect of the present invention, there is provided a communication state indication method implemented in a communication system that establishes communication between a plurality of communication apparatuses with display functions, and administers the communication apparatuses to display information of the communication apparatuses, the method including changing a display state of information of a communication apparatus of the communication system that is sustaining a communication error.

According to an embodiment of the present invention, by changing a display state of information of a communication apparatus when a communication error occurs in a communication with the communication apparatus, the information being exchanged between communication apparatuses may be displayed according to the communication states of the communications established between the communication apparatuses. Accordingly, a user may be able to perceptually recognize communication states of plural communication apparatuses.

DETAILED DESCRIPTION OF THE PREFERRED EMBODIMENTS

In the following, principles and embodiments of the present invention will be described with reference to the accompanying drawings.

It is noted that in the following descriptions, a wireless communication system is illustrated as an embodiment of a communication game system of the present invention.

Figure 1:
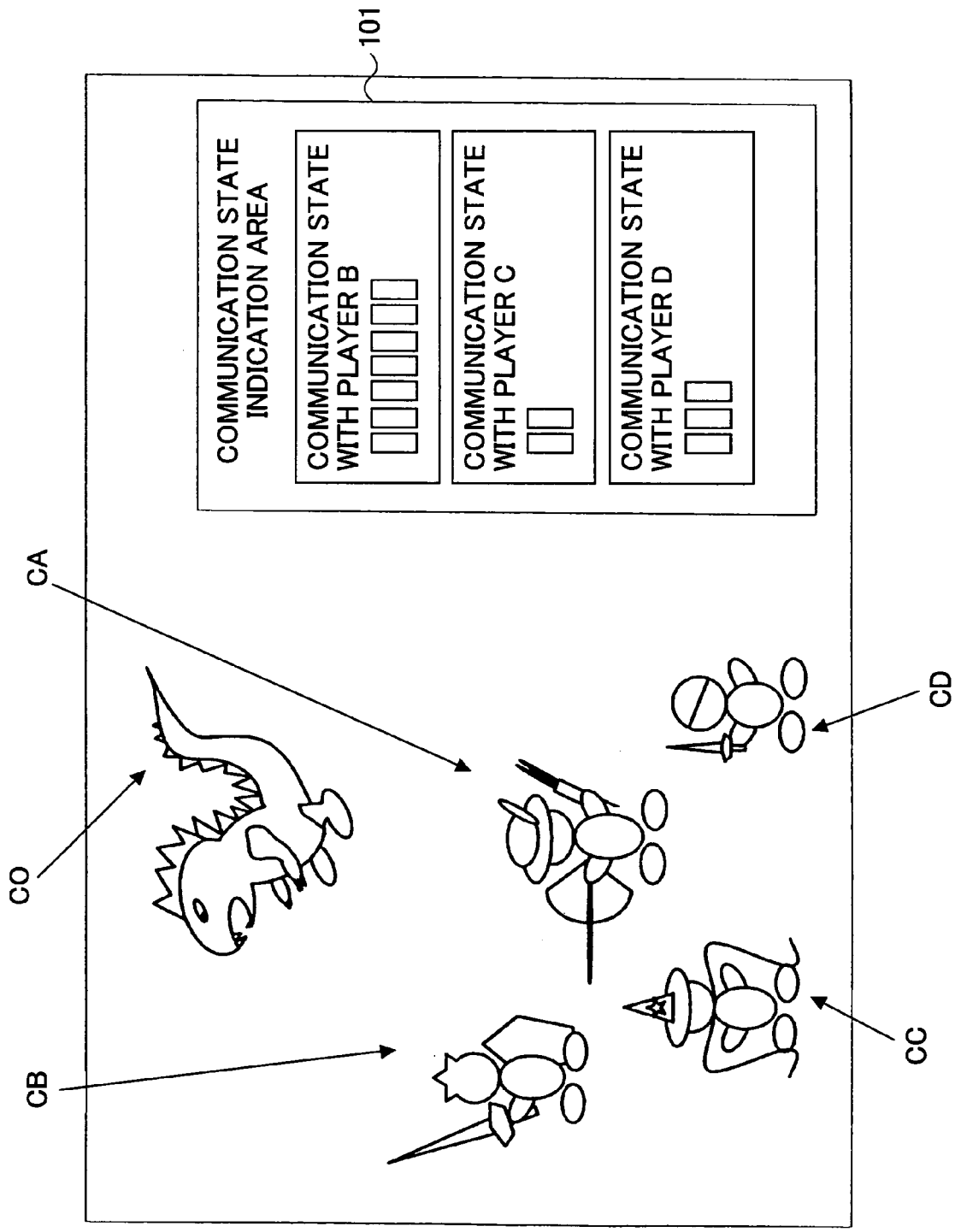
FIG. 1 is a diagram illustrating a display screen of a game terminal apparatus in a conventional communication game system.
Figure 2:
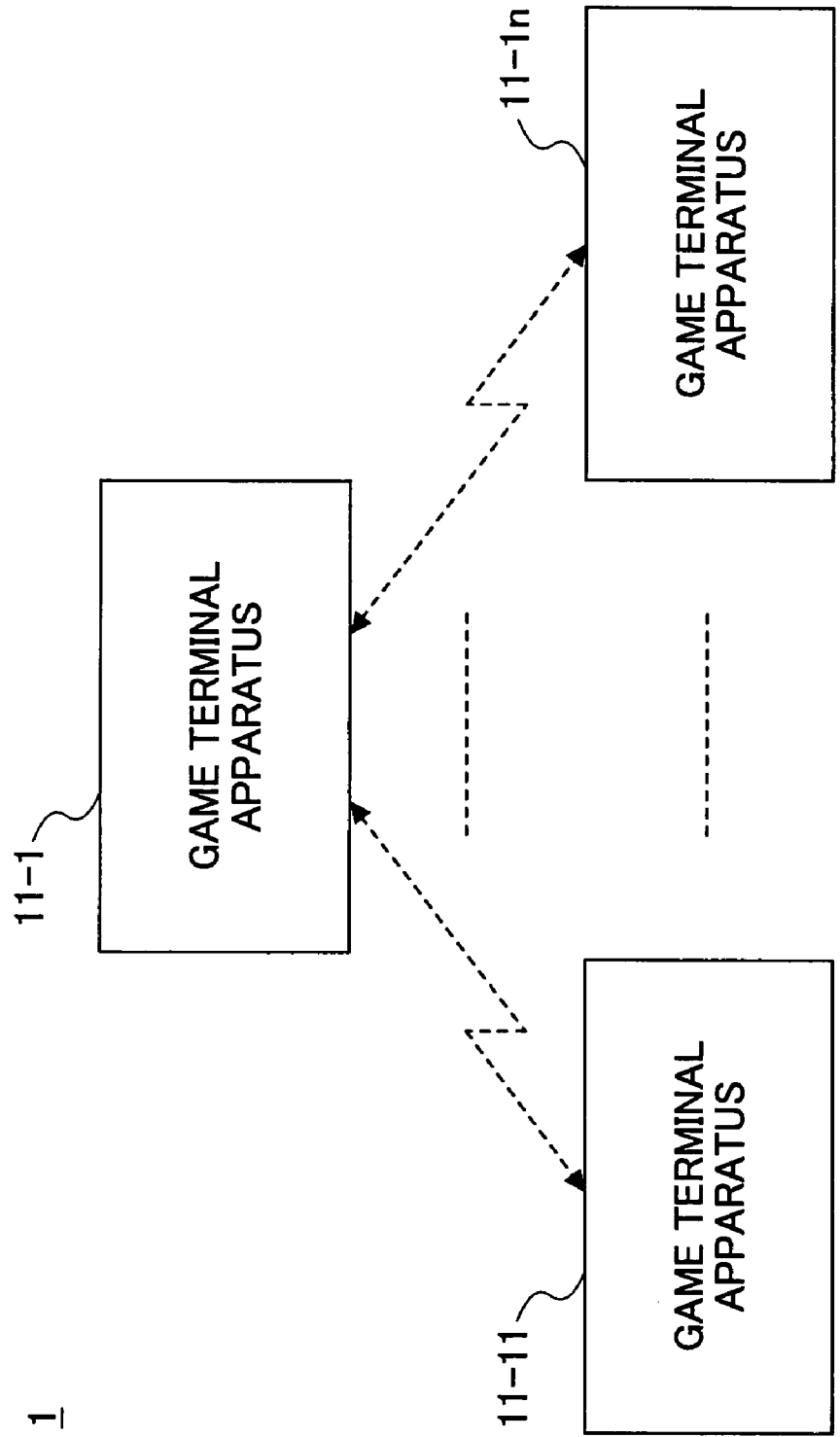
FIG. 2 is a block diagram illustrating a configuration of a communication game system according to an embodiment of the present invention.

FIG. 2 is a block diagram illustrating a configuration of a communication game system 1 according to an embodiment of the present invention.

The communication game system 1 according to the present embodiment includes game terminal apparatuses 11-1 and 11-11~11-1$n$ that are capable of realizing wireless communication. A game may be played between the game terminal apparatuses 11-1 and 11-11~11-1$n$ by exchanging coordinates information, for example.

Of the game terminal apparatuses 11-1 and 11-11~11-1$n$, the game terminal apparatus 11-1 corresponding to the first game terminal apparatus to start a wireless communication program is set to be a master apparatus. Then, the game terminal apparatuses 11-11~11-1$n$ that start their respective wireless communication programs after the wireless communication program at the game terminal apparatus 11-1 is started are recognized as slave apparatuses by the game terminal apparatus 11-1 corresponding to a master apparatus. The wireless program of each game terminal apparatus is started by operating an operation unit 21 that is implemented in each game terminal apparatus as is illustrated in FIG. 3.

The game terminal apparatus 11-1 corresponding to the master apparatus gathers information such as coordinates information and movement information of characters of a game from the game terminal apparatuses 11-11~11-1$n$ corresponding to slave apparatuses. Based on the gathered information, the game terminal apparatus 11-1 controls the development of the game at its own apparatus and sends the gathered information to each of the game terminal apparatuses 11-11~11-1$n$ corresponding to slave apparatuses. Each of the game terminal apparatuses 11-11~11-1$n$ corresponding to slave apparatuses controls the development of the game based on the gathered information sent from the game terminal apparatuses 11-1 corresponding to a master apparatus.

In the following, a configuration of an exemplary game terminal apparatus 11-1 and 11-11~11-1$n$ is described. A configuration of the game terminal apparatus 11-1 in accordance with an embodiment of the present invention is described below as a representative example.

Figure 3:
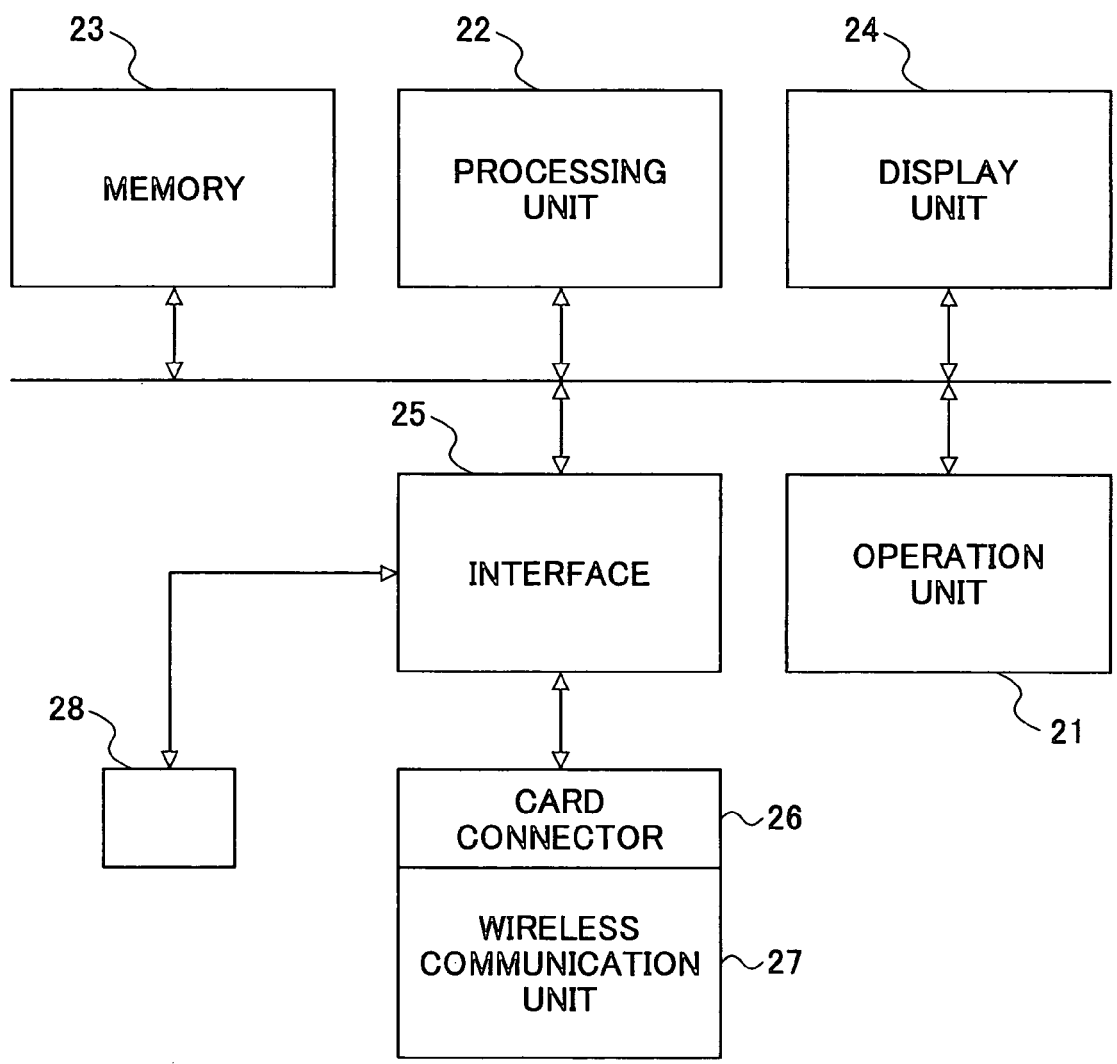
FIG. 3 is a block diagram illustrating a configuration of a game terminal apparatus.

FIG. 3 is a block diagram illustrating the configuration of the game terminal apparatus 11-1.

The game terminal apparatus 11-1 includes an operation unit 21, a processing unit 22, a memory 23, a display unit 24, an interface 25, a card connector 26, a wireless communication unit 27, and an external interface port 28.

The operation unit 21 may correspond to a device such as a pointing device or a key switch for inputting positioning and movement of a character, for example, and is adapted to generate operation information according to an input operation executed by a player. The operation information generated at the operation unit 21 is supplied to the processing unit 22.

The processing unit 22 processes data based on a program stored in the memory 23. The memory 23 may correspond to a storage unit such as a flash ROM or RAM, and may store programs such as a game program and a communication program, for example. The memory 23 may also be used as a working memory area for the processing unit 22.

Alternatively, a game program may be stored in a detachable memory cartridge, and this memory cartridge may be set to the game terminal apparatus 11-1 to run the game program.

The processing unit 22 may also control a display state of characters and other objects displayed on the display unit 24 based on the operation information supplied from the operation unit 21 and position information supplied from the interface 25. The display unit 24 may correspond to an LCD (liquid crystal device), and may output and display data based on display data generated at the processing unit 22.

The interface 25 corresponds to an interface implemented between the card connector 26, the external interface port 28, and the processing unit 22. The wireless communication unit 27 is connected to the card connector 26. The wireless communication unit 27 corresponds to a device for establishing wireless communication with other wireless communication units 27 that are implemented at the other game terminal apparatuses 11-11~11-1n. The external interface port 28 corresponds to a connector for establishing connection with peripheral apparatuses of the game terminal apparatus.

In the following, an overall operation of the communication game system 1 is described.

Figure 4:
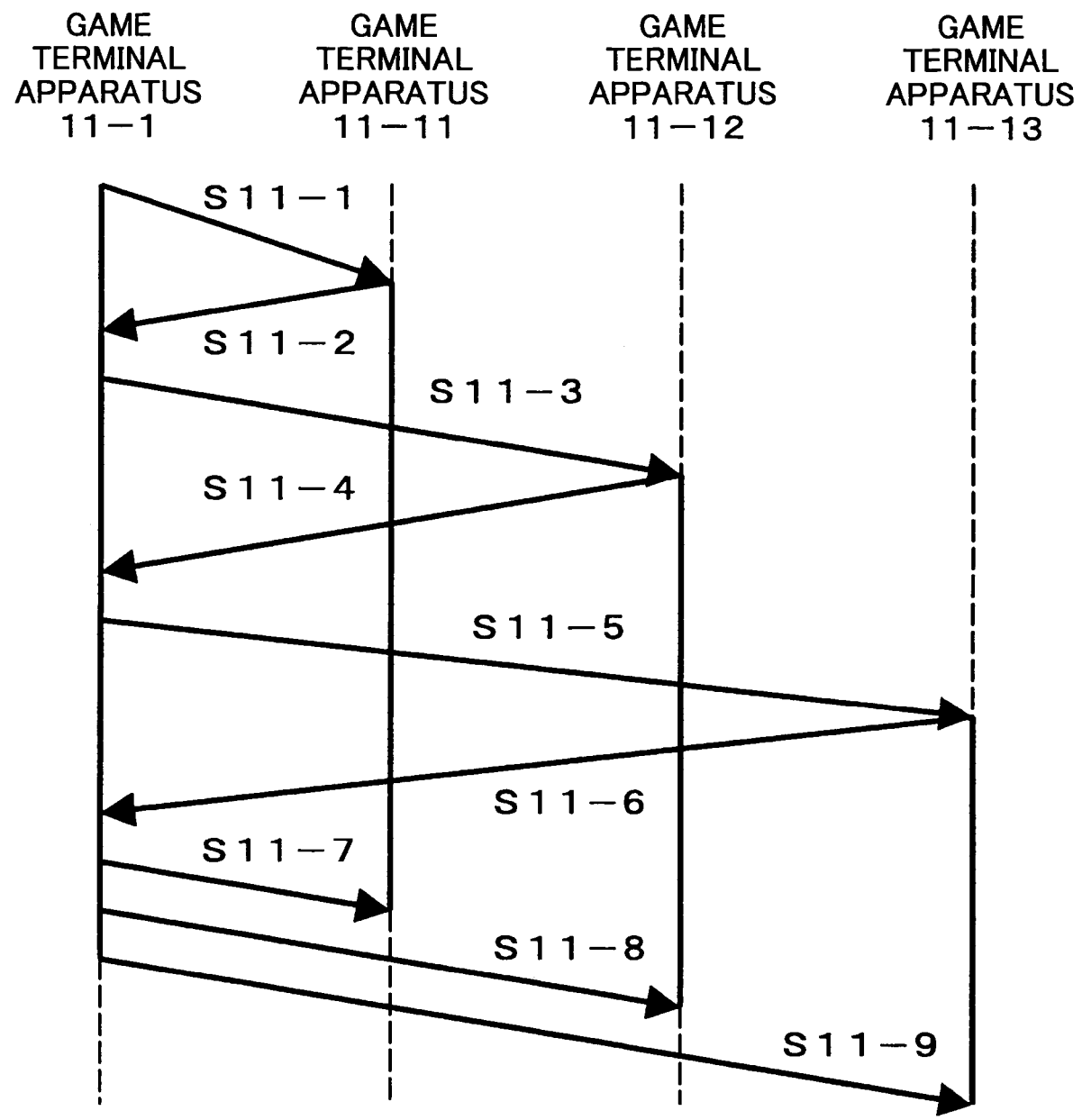
FIG. 4 is a diagram illustrating an operation of the game system of FIG. 2 under normal conditions.
Figure 5A:
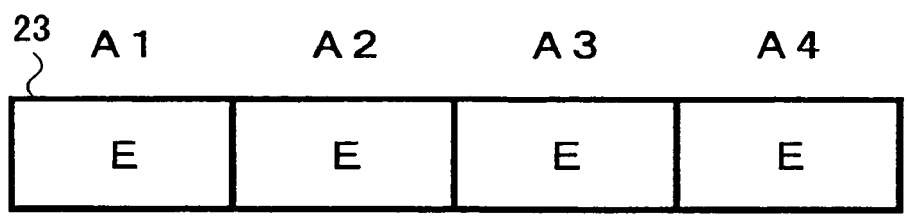
FIGS. 5A~5E are diagrams illustrating state data storing processes conducted in the operation of FIG. 4.
Figure 5B:
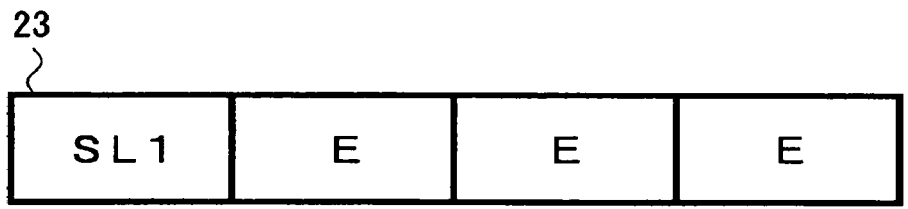
Figure 5C:
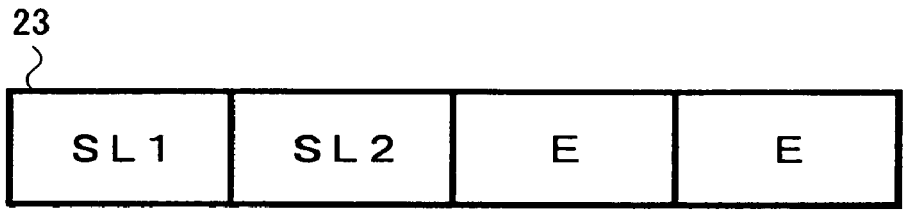
Figure 5D:
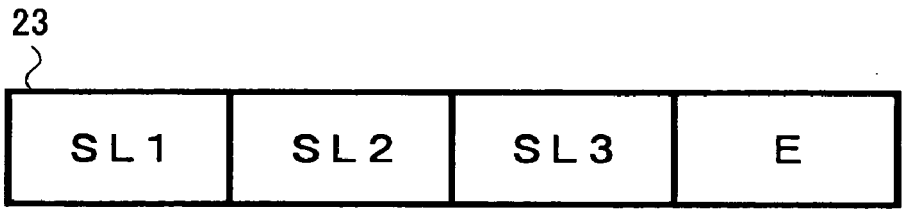
Figure 5E:
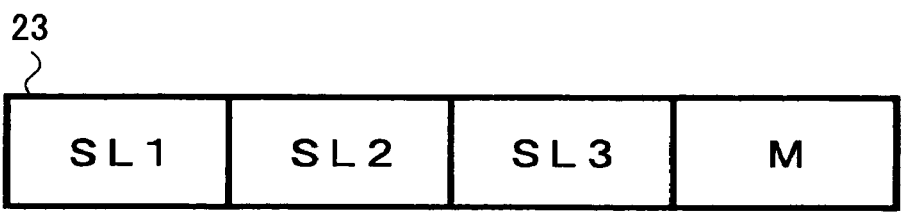
Figure 6A:
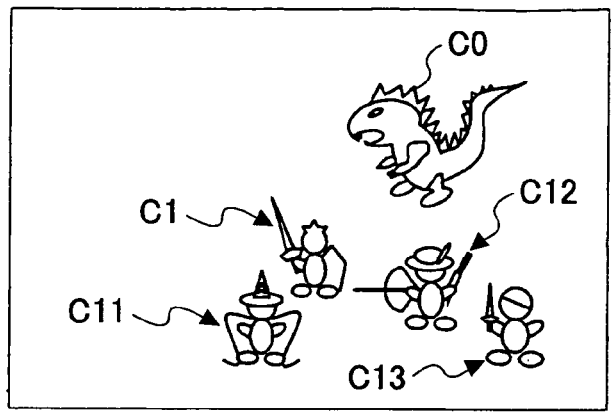
FIGS. 6A~6D are diagrams illustrating display screens of game terminal apparatuses from conducting the operation of FIG. 4.
Figure 6B:
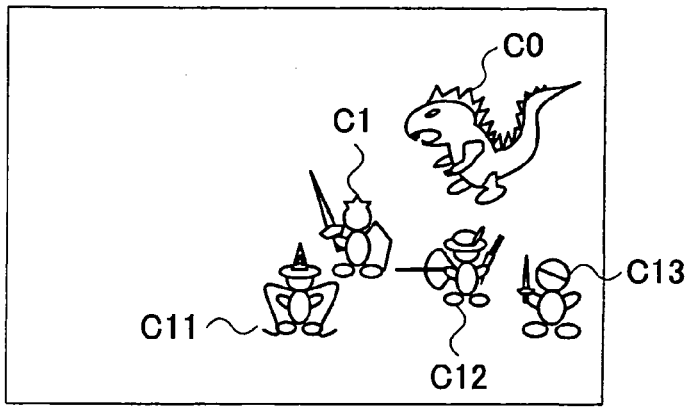
Figure 6C:
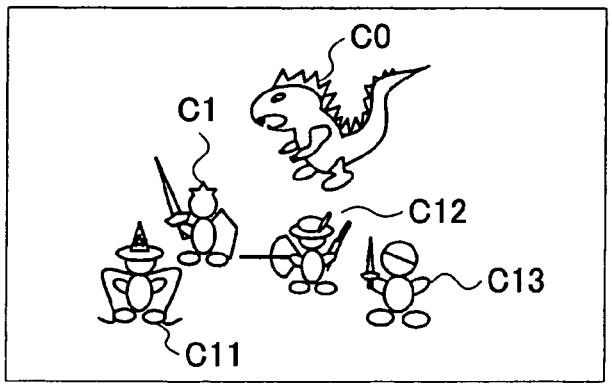
Figure 6D:
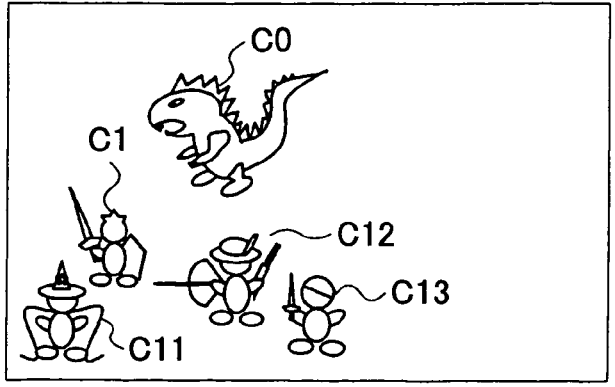

FIG. 4, FIGS. 5A~5E, and FIGS. 6A~6D are diagrams illustrating operation processes of the communication game system 1 under normal conditions (i.e., where no communication error occurs). It is noted that FIG. 6A shows a display screen of game terminal apparatus 11-1, FIG. 6B shows a display screen of game terminal apparatus 11-11, FIG. 6C shows a display screen of game terminal apparatus 11-12, and FIG. 6D shows a display screen of game terminal apparatus 11-13. Also, in FIGS. 6A~6D, character C1 corresponds to a character that is controlled by the game terminal apparatus 11-1, character C11 corresponds to a character that is controlled by the game terminal apparatus 11-11, character C12 corresponds to a character that is controlled by the game terminal apparatus 11-12, character C13 corresponds to a character that is controlled by the game terminal apparatus 11-13, and character C0 corresponds to an enemy character that is automatically controlled by the game program. The characters C1 and C11-C13 are controlled by operation inputs made by the respective players operating the game terminal apparatuses 11-1 and 11-11~11-13. By exchanging result information (e.g., coordinates data) obtained from the respective control operations, plural characters respectively controlled by plural players may be displayed together on a game terminal apparatus screen.

FIG. 4 illustrates a process of the master apparatus establishing communication with its slave apparatuses. As is illustrated in this drawing, in step S11-1, the game terminal apparatus 11-1 corresponding to the master apparatus sends a state inquiry to the game terminal apparatus 11-11 corresponding to a slave apparatus. In turn, the game terminal apparatus 11-11 sends state data SL1 to the game terminal apparatus 11-1 in step S11-2 in response to the inquiry made by the game terminal apparatus 11-1. State data may correspond to coordinates data indicating a position of a character being controlled by a game terminal apparatus, for example. Accordingly, in step S11-2, the game terminal apparatus 11-11 may send coordinates data of character C11 as state data SL1.

FIGS. 5A~5E illustrate a process of storing state data in the memory 23 of the game terminal apparatus 11-1. In this example, the memory 23 includes storage areas A1~A4 for storing the respective state data of the game terminal apparatuses 11-1 and 11-11~11-13. The storage areas A1~A4 may be empty as is shown in FIG. 5A (the empty states being represented by 'E') before communication is established between the game terminal apparatuses 11-11~11-13.

When the game terminal apparatus 11-1 receives the state data SL1 from the game terminal apparatus 11-1 as is illustrated in step S11-2 of FIG. 4, the game terminal apparatus 11-1 stores the received state data SL1 in the state data storage area A1 of the memory 23 as is shown in FIG. 5B.

In step S11-3 of FIG. 4, the game terminal apparatus 11-1 sends a state inquiry to the game terminal apparatus 11-12. In turn, the game terminal apparatus 11-12 sends state data SL2 to the game terminal apparatus 11-1 in step S11-4 in response to the inquiry made by the game terminal apparatus 11-1; for example, the game terminal apparatus 11-12 sends coordinates data of character C12 to the game terminal apparatus 11-1.

Upon receiving the state data SL2 from the game terminal apparatus 11-12, the game terminal apparatus 11-1 stores the received state data SL2 in the state data storage area A2 of the memory 23 as is shown in FIG. 5C.

Then, in step S11-5 of FIG. 4, the game terminal apparatus 11-1 sends a state inquiry to the game terminal apparatus 11-13. In turn, the game terminal apparatus 11-13 sends state data SL3 to the game terminal apparatus 11-1 in step S11-6 in response to the inquiry made by the game terminal apparatus 11-1; for example, the game terminal apparatus 11-13 sends coordinates data of character C13 to the game terminal apparatus 11-1.

Upon receiving the state data SL3 from the game terminal apparatus 11-13, the game terminal apparatus 11-1 stores the received state data SL3 in the state data storage area A3 of the memory 23 as is shown in FIG. 5D.

After the game terminal apparatus 11-1 obtains the respective state data of the game terminal apparatuses 11-11~11-13 and stores the state data in the memory 23, the game terminal apparatus 11-1 stores state data M generated at its own apparatus in its memory 23; for example, the game terminal apparatus 11-1 stores coordinates data of its own character C1 in the state data storage area A4 of the memory 23 as is shown in FIG. 5E.

In steps S11-7~S11-9 of FIG. 4, the game terminal apparatus 11-1 sends the data represented by FIG. 5E including the state data of the game terminal apparatuses 11-1 and 11-11~11-13 to the game terminal apparatuses 11-11~11-13. In the illustrates exemplary embodiment, the game terminal apparatus 11-1 sends the coordinates data of the characters C1 and C11~C13 to the game terminal apparatuses 11-11~11-13.

In turn, the display state of the display screen of each of the game terminal apparatuses 11-1 and 11-11~11-13 may be updated by the state data represented by FIG. 5E.

In the present example, the display state of the game terminal apparatus 11-1 may be changed based on state data M generated at its own apparatus and the state data SL1~SL3 obtained from the game terminal apparatuses 11-11~11-13, respectively. At the game terminal apparatus 11-1, the character C1 controlled by the game terminal apparatus 11-1 may be positioned around the center of the screen as is shown in FIG. 6A, for example, and its display state may be changed according to state data M. The display states of the characters C11~C13 of the game terminal apparatuses 11-11~11-13 may be changed according to their state data SL1~SL3. Herein, the character C1 may be positioned around the center of the screen, and when the position of the character C1 is changed, the positions of the characters C0 and C11~C13 may be relatively changed with respect to the position change of character C1.

The display state of the game terminal apparatus 11-11 may be changed based on state data SL1 generated at its own apparatus, and the state data M, SL2, and SL3 obtained from the game terminal apparatuses 11-1, 11-12, and 11-13, respectively. At the game terminal apparatus 11-11, the character C11 controlled by the game terminal apparatus 11-11 may be displayed around the center of the screen as is shown in FIG. 6B, for example, and its display state may be changed according to state data SL1. The display states of the characters C1, C12, and C13 of the game terminal apparatuses 11-1, 11-12, and 11-13 may be changed according to their state data M, SL2, and SL3. Herein, the character C11 may be positioned around the center of the screen, and when the position of the character C11 is changed, the positions of the characters C0, C1, C12, and C13 may be relatively changed with respect to the position change of the character C11.

The display state of the game terminal apparatus 11-12 may be changed based on the state data SL2 generated at its own apparatus, and the state data M, SL1, and SL3 obtained from the game terminal apparatuses 11-1, 11-11, and 11-13, respectively. At the game terminal apparatus 11-12, the character C12 controlled by the game terminal apparatus 11-12 may be displayed around the center of the screen as is shown in FIG. 6C, for example, and its display state may be changed according to state data SL2. The display states of the characters C1, C11, and C13 of the game terminal apparatuses 11-1, 11-11, and 11-13 may be changed according to their state data M, SL1, and SL3. Herein, the character C12 may be positioned around the center of the screen, and when the position of the character C12 is changed, the positions of the characters C0, C1, C11, and C13 may be relatively changed with respect to the position change of the character C12.

The display state of the game terminal apparatus 11-13 may be changed based on the state data SL3 generated at its own apparatus and the state data M, SL1, and SL2 obtained from the game terminal apparatuses 11-1, 11-11, and 11-12, respectively. At the game terminal apparatus 11-13, the character C13 controlled by the game terminal apparatus 11-13 may be displayed around the center of the screen as is shown in FIG. 6D, for example, and its display state may be changed according to state data SL3. The display states of the characters C1, C11, and C12 of the game terminal apparatuses 11-1, 11-11, and 11-12 may be changed according to their state data M, SL1, and SL2. Herein, the character C13 may be positioned around the center of the screen, and when the position of the character C13 is changed, the positions of the characters C0, C1, C11, and C12 may be relatively changed with respect to the position change of the character C13.

Also, it is noted that state data, for example, coordinates data in the illustrated embodiment, of the enemy character C0 that is automatically maneuvered by a program of the game terminal apparatus 11-1 corresponding to the master apparatus may be sent to the game terminal apparatuses 11-11~11-13 along with the state data M and SL1~SL3. Accordingly, the game terminal apparatuses 11-11~11-13 corresponding to the slave apparatuses may receive the state data of the enemy character C0 and change the display state of the enemy character C0 on their respective screens based on the received state data.

In the following, operation processes of the game system 1 in a case where a communication error occurs, for example, between the game terminal apparatus 11-1 and the game terminal apparatus 11-11 are described.

Figure 7:
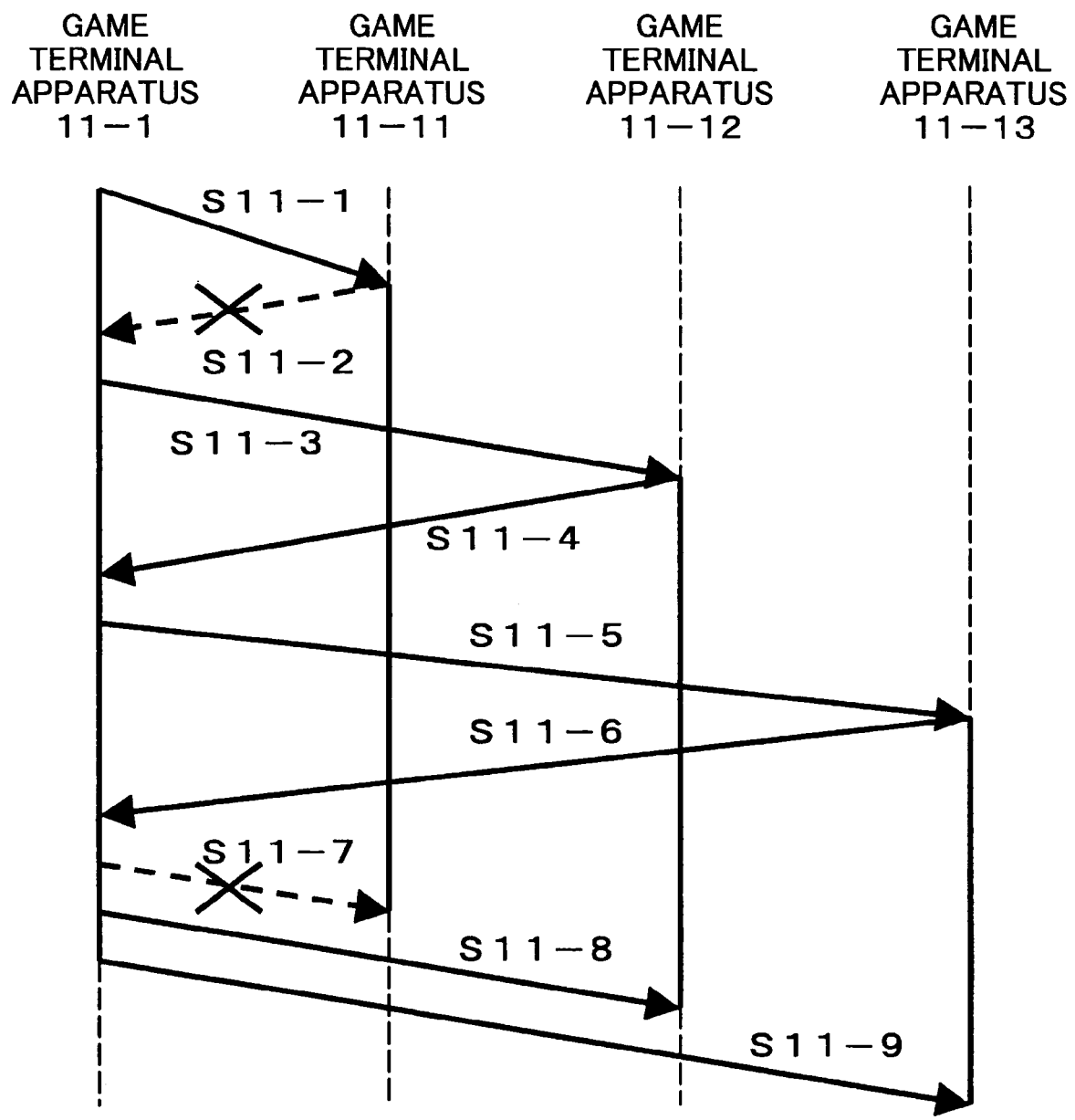
FIG. 7 is a diagram illustrating an operation of the game system of FIG. 2 in a case where a communication error occurs.
Figure 8A:
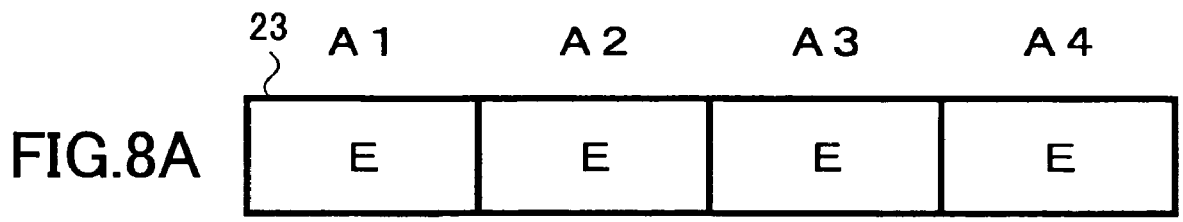
FIGS. 8A~8E are diagrams illustrating state data storing processes conducted in the operation of FIG. 7.
Figure 8B:
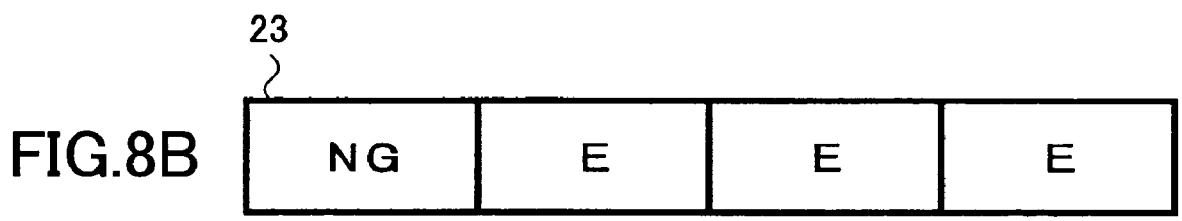
Figure 8C:
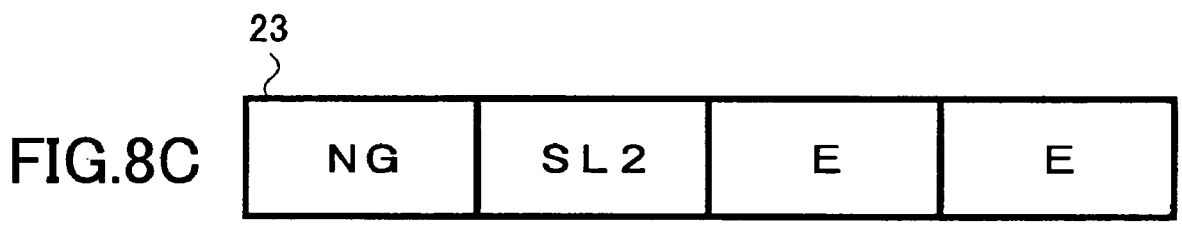
Figure 8D:
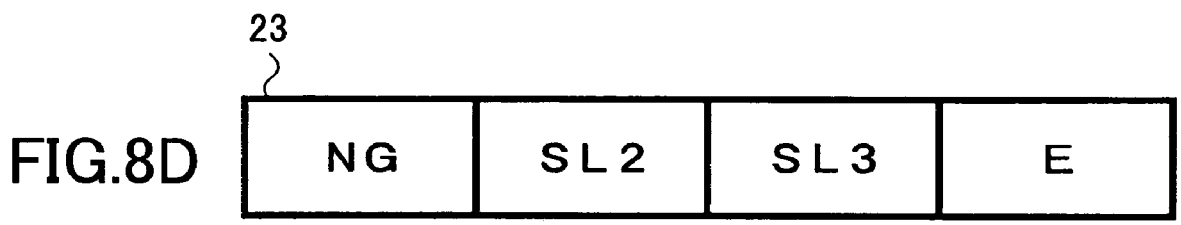
Figure 8E:
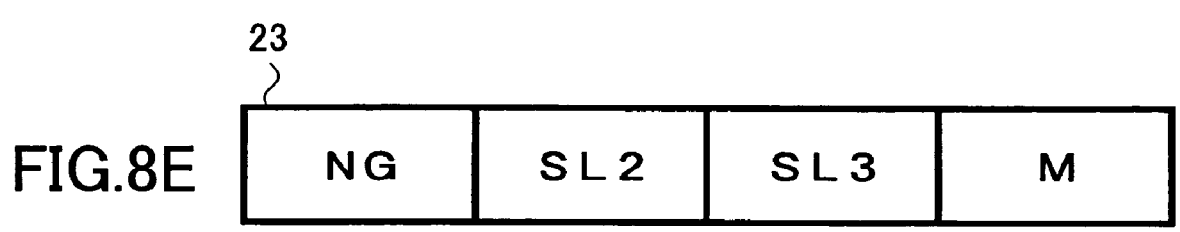
Figure 9A:
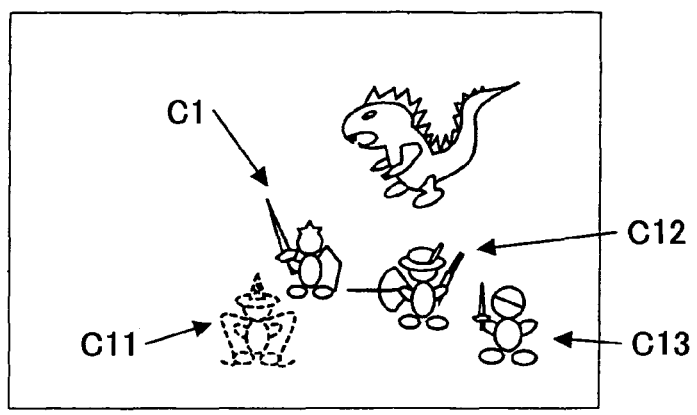
FIGS. 9A~9D are diagrams illustrating display screens of game terminal apparatuses from conducting the operation of FIG. 7.
Figure 9B:
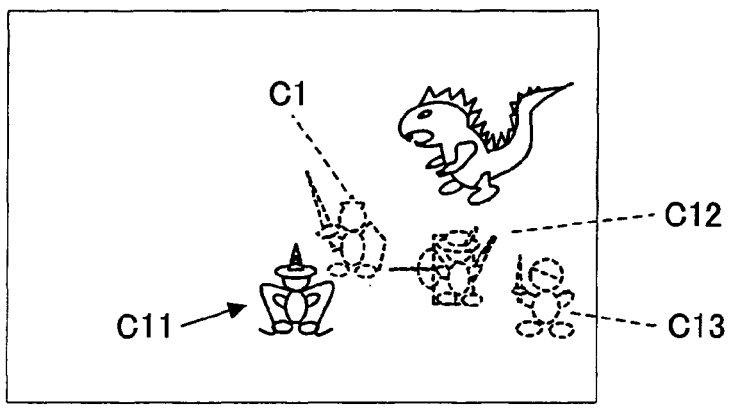
Figure 9C:
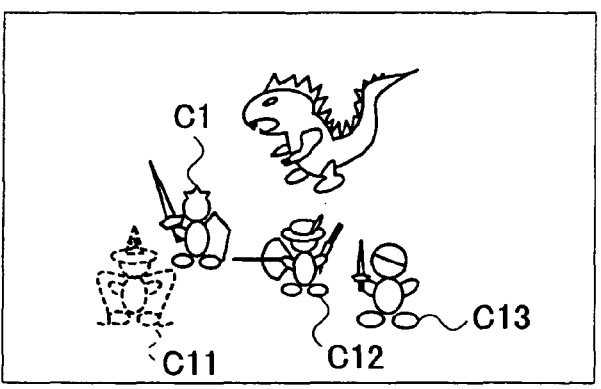
Figure 9D:
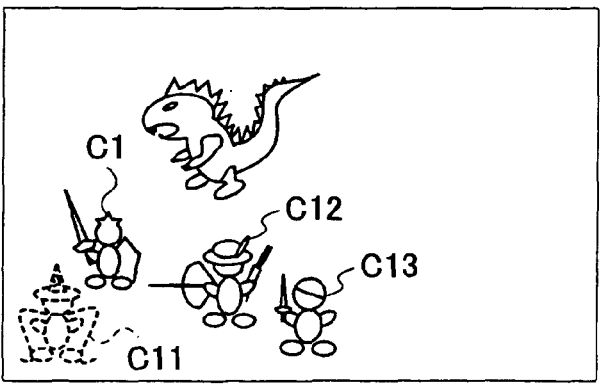

FIGS. 7, 8A~8E, and 9A~9D are diagrams illustrating operations of the game system 1 in a case where a communication error occurs. It is noted that FIG. 9A shows a display screen of the game terminal apparatus 11-1, FIG. 9B shows a display screen of the game terminal apparatus 11-11, FIG. 9C shows a display screen of the game terminal apparatus 11-12, and FIG. 9D shows a display screen of the game terminal apparatus 11-13.

Referring to FIG. 7, in step S11-1, the game terminal apparatus 11-1 corresponding to the master apparatus sends a state inquiry to the game terminal apparatus 11-11 corresponding to a slave apparatus. Herein, when a communication error occurs between the game terminal apparatus 11-1 and the game terminal apparatus 11-11 in step S11-2 as is indicated by a dashed line and a cross in this drawing, namely, when the game terminal apparatus 11-1 does not receive a response to its state inquiry before a predetermined time (timeout), the game terminal apparatus 11-1 stores communication error information NG in the state data storage area A1 of the memory 23, as is illustrated in FIG. 8B.

Then, the game terminal apparatus 11-1 sends a state inquiry to the game terminal apparatus 11-12 in step S11-3 as is shown in FIG. 7. In turn, the game terminal apparatus 11-12 sends its state data SL2 to the game, terminal apparatus 11-1 in step S11-4 in response to the state inquiry made by the game terminal apparatus 11-1.

Upon receiving the state data SL2 from the game terminal apparatus 11-12, the game terminal apparatus 11-1 stores the received state data SL2 in the state data storage area A2 of the memory 23 as is shown in FIG. 8C.

Then, the game terminal apparatus 11-1 sends a state inquiry to the game terminal apparatus 11-13 in step S11-5 as is shown in FIG. 7. In turn, the game terminal apparatus 11-13 sends its state data SL3 to the game terminal apparatus 11-1 in step S11-6 in response to the state inquiry made by the game terminal apparatus 11-1.

Upon receiving the state data SL3 from the game terminal apparatus 11-13, the game terminal apparatus 11-1 stores the received state data SL3 in the state data storage area A3 of the memory 23 as is shown in FIG. 8D.

After the game terminal apparatus 11-1 obtains the respective state data of the game terminal apparatuses 11-11~11-13 and stores the obtained data in the memory 23, the game terminal apparatus 11-1 stores its own state data M in the state data storage area A4 of the memory 23 as is shown in FIG. 8E.

In steps S11-7~S11-9 of FIG. 7, the game terminal apparatus 11-1 sends the data as represented by FIG. 8E containing the communication error information NG as the state data of the game terminal apparatus 11-11, and the state data SL2, SL3, and M of the game terminal apparatuses 11-12, 11-13, and 11-1 to the game terminal apparatuses 11-12 and 11-13. It is noted that in the present example, the game terminal apparatus 11-1 is unable to send the state data of the game terminal apparatuses to the game terminal apparatus 11-1 due to communication error (see step S11-7 of FIG. 7).

At each of the game terminal apparatuses 11-1, 11-12, and 11-13 the display state is updated based on the state data of FIG. 8E in a manner similar to that described above with reference to FIGS. 4, 5A~5E, and 6A~6D. However, in the present example, at the game terminal apparatus 11-1, since the communication error information NG is stored as state data of the game terminal apparatus 11-11, the character C11 that is controlled by the game terminal apparatus 11-11 may not be displayed or it may be displayed in an obscure or semi-transparent state as is shown in FIG. 9A. On the other hand, the characters C12 and C13 controlled by the game terminal apparatuses 11-12 and 11-13, respectively, and the character C1 controlled at the game terminal apparatus 11-1 itself (self-controlled character), may be displayed in a normal manner, and their display states may be changed according to the state data SL2, SL3, and M.

At the game terminal apparatus 11-11, the state data M, SL2, and SL3 of the game terminal apparatuses 11-1, 11-12, and 11-13 cannot be obtained due to communication error, and thereby, the character C11 that is controlled by the game terminal apparatus 11-11 itself (self-controlled character) may be displayed in a normal manner but the characters C1, C12, and C13 controlled by the other game terminal apparatuses 11-1, 11-12, and 11-13 may not be displayed or may be displayed in an obscure or semi-transparent state as is shown in FIG. 9B.

At the game terminal apparatus 11-12, since the communication error information NG is stored as state data of the game terminal apparatus 11-11, the character C11 that is controlled by the game terminal apparatus 11-11 may not be displayed or it may be displayed in an obscure or semi-transparent state as is shown in FIG. 9C. On the other hand, the characters C1 and C13 controlled by the game terminal apparatuses 11-1 and 11-13, respectively, and the character C12 controlled at the game terminal apparatus 11-12 itself (self-controlled character) may be displayed in a normal manner, and their display states may be changed according to the state data M, SL2, and SL3.

At the game terminal apparatus 11-13, since the communication error information NG is stored as state data of the game terminal apparatus 11-11, the character C11 that is controlled by the game terminal apparatus 11-11 may not be displayed or it may be displayed in an obscure or semi-transparent state as is shown in FIG. 9D. On the other hand, the characters C1 and C12 controlled by the game terminal apparatuses 11-1 and 11-12, respectively, and the character C13 controlled at the game terminal apparatus 11-13 itself (self-controlled character) may be displayed in a normal manner, and their display states may be changed according to the state data M, SL2, and SL3.

It is noted that the occurrence of a communication error gradually increases as the communication state between game terminal apparatuses deteriorates. Accordingly, the display state of the character C11 of the game terminal apparatus 11-11 being displayed at the game terminal apparatuses 11-1, 11-12, and 11-13 goes back and forth from a normal display state to a non-display state, an obscure state, or a semi-transparent state to gradually disappear. In this way, the players of the game terminal apparatuses 11-1, 11-12, and 11-13 are able to recognize that the communication state of the game terminal apparatus 11-11 is deteriorating based on the display state of the character C11. Also, at the game terminal apparatus 11-11, the characters C1, C12, and C13 of the game terminal apparatuses 11-1, 11-12, and 11-13 being displayed may gradually disappear from the display screen in a similar manner, and therefore, the player of the game terminal apparatus 11-11 may also be able to recognize that the communication state at its own apparatus is deteriorating.

Figure 10:
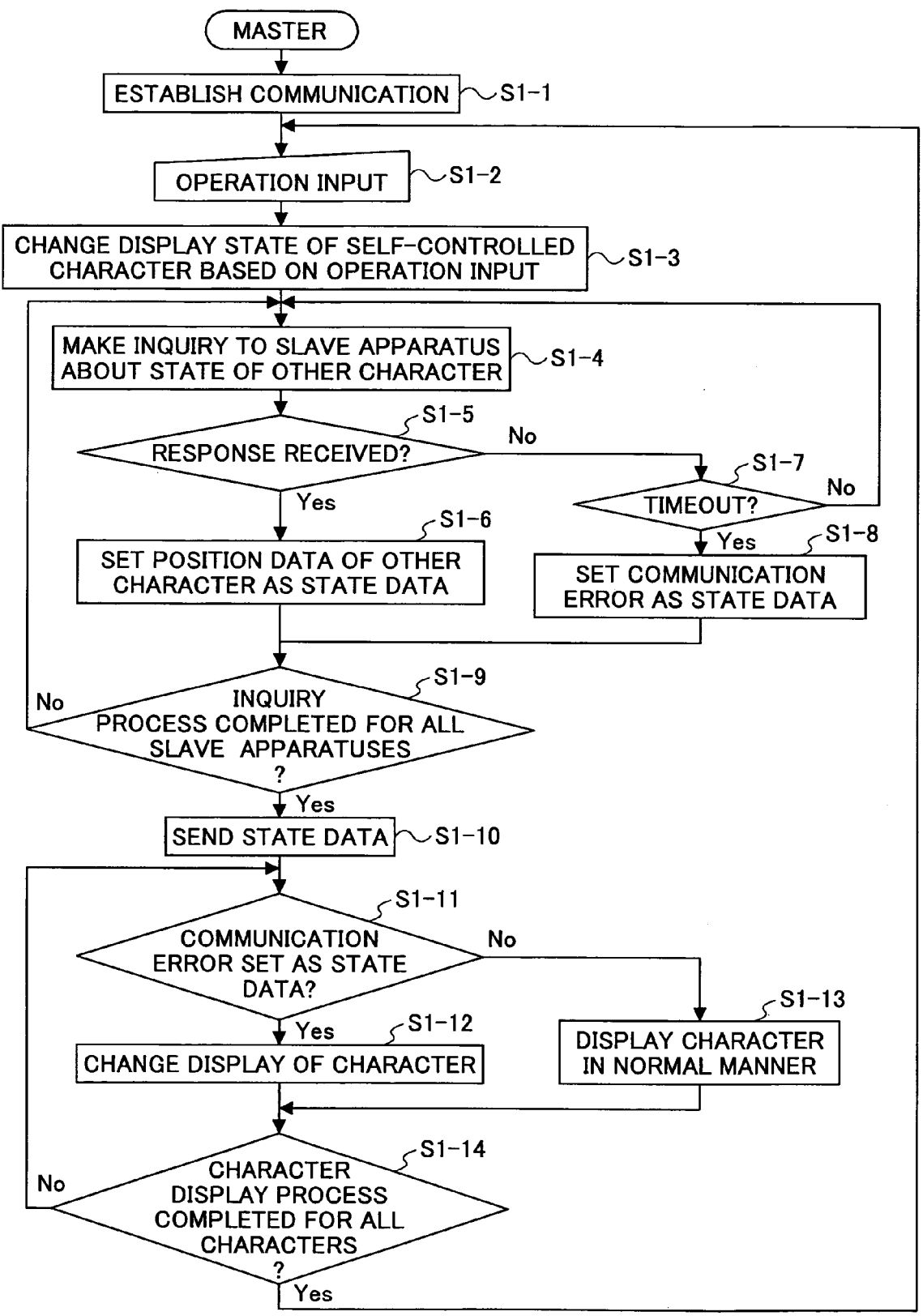
FIG. 10 is a flowchart illustrating operation processes of a game terminal apparatus corresponding to a master apparatus.

In the following, operation processes of the game terminal apparatuses are described with reference to FIGS. 10 and 11. First, the operation processes of an exemplary master apparatus (e.g., game terminal apparatus 11-1) are described with reference to FIG. 10.

The operation of the game terminal apparatus 11-1 is controlled by a program stored in the memory 23. In step S1-1, the game terminal apparatus 11-1 establishes communication with the game terminal apparatuses 11-11~11-1n. Then, when an operation input is made in step S1-2, the game terminal apparatus 11-1 changes the position of its own character C1 (self-controlled character) in step S1-3 based on the operation input. It is noted that in the above examples, 'n' corresponds to '3' (i.e., 11-1n=11-13).

In step S1-4, the game terminal apparatus 11-1 sends a state inquiry to a game terminal apparatus 11-1i corresponding to one of the game terminal apparatuses. 11-11~11-1n about a state, for example, a position, of a character. Then, when a response containing state data is received from the game terminal apparatus 11-1i in step S1-5, the game terminal apparatus 11-1 sets the state data of the game terminal apparatus 11-1i in its memory.

If the game terminal apparatus 11-1 does not receive a response from the game terminal apparatus 11-1i in step S1-5, and if it is determined in step S1-7 that a predetermined time period has elapsed without receiving any response (timeout), the game terminal apparatus 11-1 sets a communication error indication as the state data of the game terminal apparatus 11-1i in step S1-8. In step S1-9, the game terminal apparatus 11-1 determines whether it has made inquiries to all its slave apparatuses, for example, the game terminal apparatuses 11-11~11-1n, and if it is determined in step S1-9 that inquiries have been made to all the slave apparatuses, the game terminal apparatus 11-1 sends the state data of the game terminal apparatuses to the game terminal apparatuses 11-11~11-1n.

If it is determined in step S1-9 that inquiries have not yet been made to all the slave apparatuses, the process goes back to step S1-4. In this way, the game terminal apparatus 11-1 corresponding the master apparatus repeatedly performs the state inquiry process of steps S1-4~S1-9 until inquiries are made to all its slave apparatuses.

Then, after the inquiry process, a character display process for displaying the respective characters of the game terminal apparatuses 11-11~11-1n is performed. In step S1-11, the game terminal apparatus 11-1 determines whether a communication error indication is set as the state data of a given one of the game terminal apparatuses 11-11~11-1n. If it is determined in step S1-11 that a communication error indication is set as the state data of the given game terminal apparatus, the game terminal apparatus 11-1 controls the display state of the corresponding character of the given game terminal apparatus to be in a non-display state, an obscure state, a blurred state, a blinking state, or a semi-transparent state, for example.

As is described above, the display state of the corresponding character of the given game terminal apparatus failing to establish communication with the game terminal apparatus 11-1 may be switched to a non-display state, or the corresponding character may alternatively be displayed in an obscure state, a blurred state, a blinking state, or a semi-transparent state, for example. In the latter cases, the corresponding character may be displayed based on the state data previously obtained from the given game terminal apparatus. In other words, the display state (e.g., display position) of the corresponding character is determined based on the previously obtained coordinates data of the given game terminal apparatus.

On the other hand, if it is determined in step S1-11 that a communication error indication is not set as the state data of the given game terminal apparatus 11-11~11-1n, the game terminal apparatus 11-1 displays the corresponding character of the given game terminal apparatus based on the presently obtained state data of the given game terminal apparatus.

In step S1-14, the game terminal apparatus 11-1 determines whether the character display process has been performed for all the characters being controlled by its slave apparatuses. The game terminal 11-1 repeats the character display process of steps S1-11~S11-14 until all the characters controlled by the game terminal apparatuses 11-11~11-1n are displayed according to their state data. When it is determined in step S1-14 that the character display process has been completed for all the characters, the process goes back to step S1-2. In this way, the game terminal apparatus 11-1 repeatedly performs the above described process steps of S1-2~S1-14 to control the game being played.

In the following, operation processes of an exempalry slave apparatus (e.g., game terminal apparatuses 11-11~11-1n) are described. Operation processes performed in the game terminal apparatus 11-11 are described below as a representative example.

Figure 11:
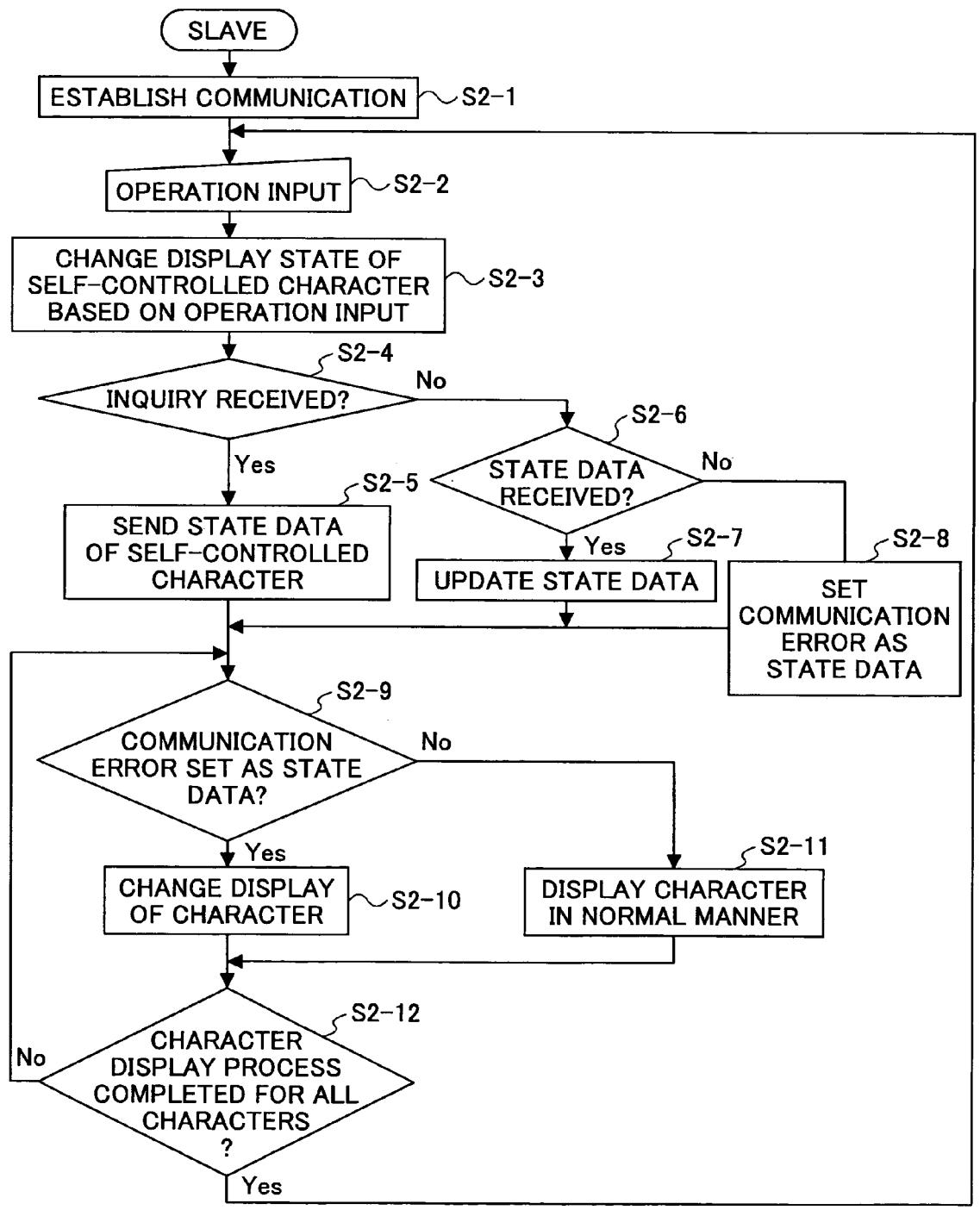
FIG. 11 is a flowchart illustrating operation processes of a game terminal apparatus corresponding to a slave apparatus.

FIG. 11 is a flowchart illustrating an operation process flow of the game terminal apparatus 11-11.

In step S2-1, the game terminal apparatus 11-11 establishes communication with the game terminal apparatus 11-1 corresponding to the master apparatus, and when an operation input is made in step S2-2, the game terminal apparatus 11-11 changes the display state, for example, the coordinates, of its own character C11 (self-controlled character) in step S2-3 based on the operation input. Then, when a state inquiry is received from the game terminal apparatus 11-1 corresponding to the master apparatus, the game terminal apparatus 11-11 sends state data pertaining to its own character C11 to the game terminal apparatus 11-1 in step S2-5. In step S2-6, the game terminal apparatus 11-11 determines whether state data of the other characters C1, C12, and C13 are received from the game terminal apparatus 11-1 corresponding to the master apparatus (step S2-4), and if the state data are received, the game terminal apparatus 11-11 updates the display states of the other characters C1, C12, and C13 in step S2-7 based on the state data received from the game terminal apparatus 11-1. When the game terminal apparatus 11-11 is unable to receive the state data of the other characters from the master apparatus in step S2-6, the game terminal apparatus 11-11 sets communication error indications as the state data of the other characters in step S2-8.

Then, in step S2-9, the game terminal apparatus 11-11 determines whether a communication error indication is set as the state data of a given game terminal apparatus 11-11~11-1n. If it is determined in step S2-9 that a communication error indication is set as the state data of the given game terminal apparatus 11-11~11-1n, in step S2-10, the game terminal apparatus 11-11 controls the display state of the corresponding character of the given game terminal apparatus 11-11~11-1n to be in a non-display state, an obscure state, a blurred state, a blinking state, or a semi-transparent state, for example. On the other hand, if it is determined in step S2-9 that a communication error indication is not set as the state data of the given game terminal apparatus, the corresponding character of the given game terminal apparatus may be displayed in a normal manner according to the state data.

In step S2-12, the game terminal apparatus 11-11 determines whether the character display process of steps S2-9~S2-12 has been performed for all the characters being controlled by the respective game terminal apparatuses. The game terminal apparatus 11-11 repeatedly performs the character display process of steps S2-9~S2-12 until all the characters controlled by the game terminal apparatuses of the game system are displayed according to their state data. When it is determined in step S2-12 that the display process for all the characters is completed, the process goes back to step S2-2. In this way, the game terminal apparatus 11-11 repeatedly performs the process steps S2-2~S2-12 to follow up on the development of the game. The above described operation processes of the slave apparatus may be performed in each of the game terminal apparatuses 11-11~11-1n so that the game being played may proceed.

It is noted that in the above examples, the characters are arranged to be controlled at the respective game terminal apparatuses; however, in an alternative embodiment, operation data generated at the operation unit of each game terminal apparatus corresponding to a slave apparatus may be sent to a game terminal apparatus corresponding to a master apparatus, and the characters may be collectively controlled at the master apparatus after which control result information such as coordinates information may be sent to the respective slave apparatuses.

Also, it is noted that although the state data is described as corresponding to coordinates data indicating the position of a character, the present invention is not limited to this embodiment and the state data may take various other forms such as data indicating a parameter value, for example.

Further, the display state of the character controlled by a game terminal apparatus failing to establish communication may be controlled in various ways including hiding the character (non-display state) or changing the display format of the character. For example, the corresponding character may be blurred, the display color of the corresponding character may be made lighter or darker, or the character may be displayed in a blinking state or a semi-transparent state.

According to the above described embodiments of the present invention, a dedicated indication area for indicating the communication state of the game terminal apparatus does not have to be provided in the display screen, and therefore, the display screen may be used efficiently.

Also, it is noted that in the above description of the preferred embodiments, application of the present invention to game terminal apparatuses is illustrated as an example. However, the present invention is not limited to the above embodiments, and for example, the present invention may generally be applied to apparatuses that share information using communication technology such as communication terminal apparatuses, or sensors that are arranged to communicate with each other.

Also, the communication established between the game terminal apparatuses may take the form of wired communication, wireless communication, or near field communication (NFC), for example. The change of the display state may be realized in various ways. For example, the display state may be switched to a non-display state, the display color may be lightened or darkened, the display may be arranged to blink, or turn semi-transparent. The game terminal apparatus may be a stationary type game terminal apparatus or a mobile type game terminal apparatus.

The present application is based on and claims the benefit of the earlier filing date of Japanese Patent Application No. 2003-070517 filed on Mar. 14, 2003, the entire contents of which are hereby incorporated by reference.

What is claimed is:

1. A communication game system for executing a communication interactive game between two or more independent game systems each has its own game apparatus, the system comprising:

a game apparatus that is adapted to establish communication with at least one other game apparatus;

the game apparatus including a display device;

an operation device; and a processing device that is adapted to execute processes for displaying on the display device a self controlled character that is controlled by an operation of the operation device; wherein said processing device, receives information pertaining to another character that is controlled by an operation of the other game apparatus, displays the other character on the display unit based on the received information, and controls a display device state of the other character with the display position of the other character on the display device unit determined based on previously received coordinate data from the other game apparatus such that the display state of the other character changes from a normal display state to one of an obscure state, a blurred state, a blinking state and a semi-transparent state when a communication state with the other game apparatus deteriorates.

2. The communication game system as claimed in claim 1, wherein:

one game apparatus of the communication game system corresponds to a main apparatus and a remaining one or more game apparatuses of the communication game system correspond to terminal apparatuses;

the main apparatus being adapted to make an inquiry to the one or more terminal apparatuses about character information pertaining to a character that is controlled by the inquired terminal apparatus, set the character information as set information of the character controlled by the inquired terminal apparatus if the character information is received from the inquired terminal apparatus, set communication error information as the set information of the character controlled by the inquired terminal apparatus if the character information is not received from the inquired terminal apparatus, and send the set information of the one or more terminal apparatuses to the one or more terminal apparatuses; and the terminal apparatus being adapted to send character information pertaining to a self-controlled character of said terminal apparatus to the main apparatus, receive the set information sent from the main apparatus, and, based on the received set information, change a display state of a character for which the communication error information is set as the set information.

* * * * *